Aug. 31, 1965  P. BERGONZO  3,203,287
CONTROL STATION FOR AN AUTOMATIC LATHE
Filed Sept. 5, 1961  5 Sheets-Sheet 1

INVENTOR
PIERRE BERGONZO
By Irwin L. Thompson
ATTY.

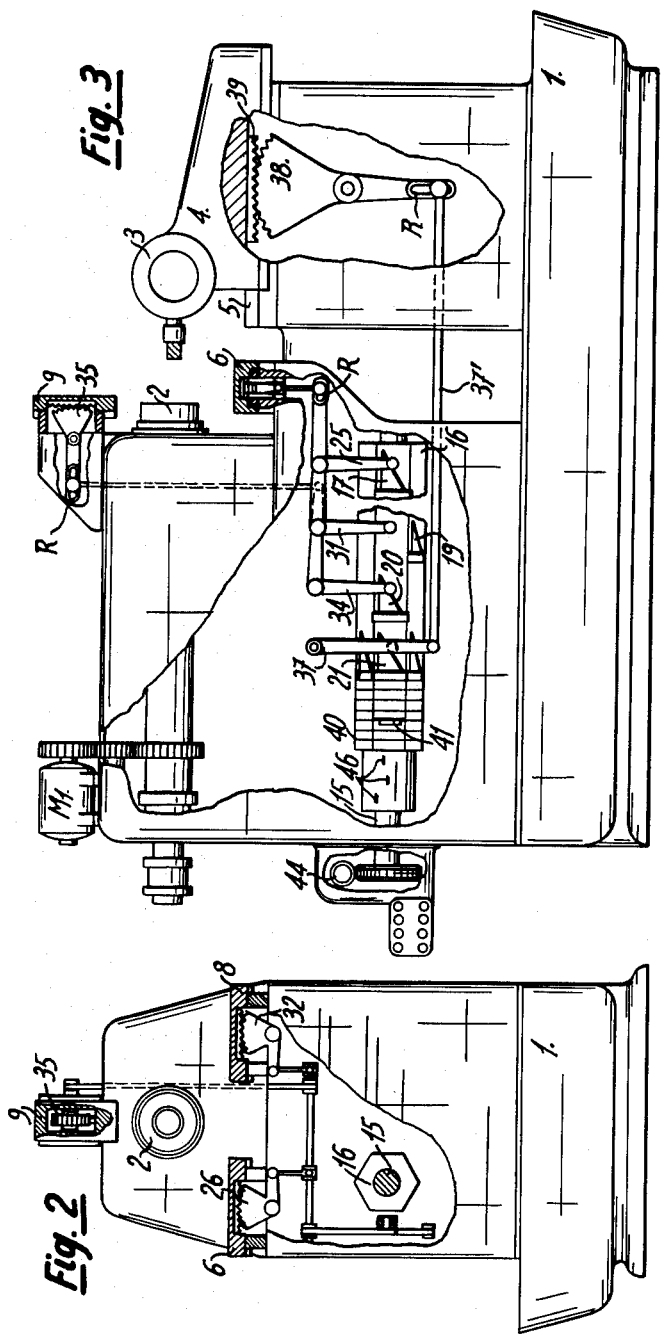

Aug. 31, 1965  P. BERGONZO  3,203,287
CONTROL STATION FOR AN AUTOMATIC LATHE
Filed Sept. 5, 1961  5 Sheets-Sheet 3
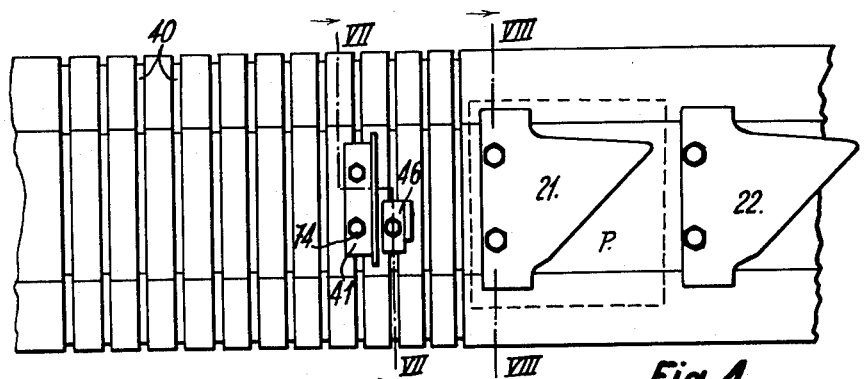
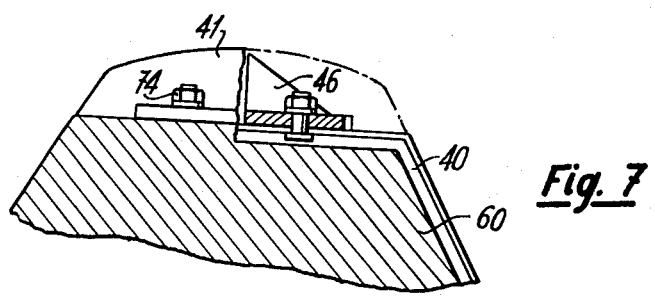
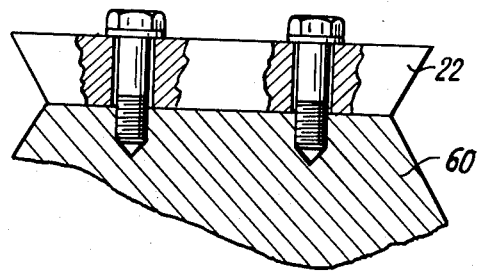
INVENTOR
PIERRE BERGONZO
ATTY.

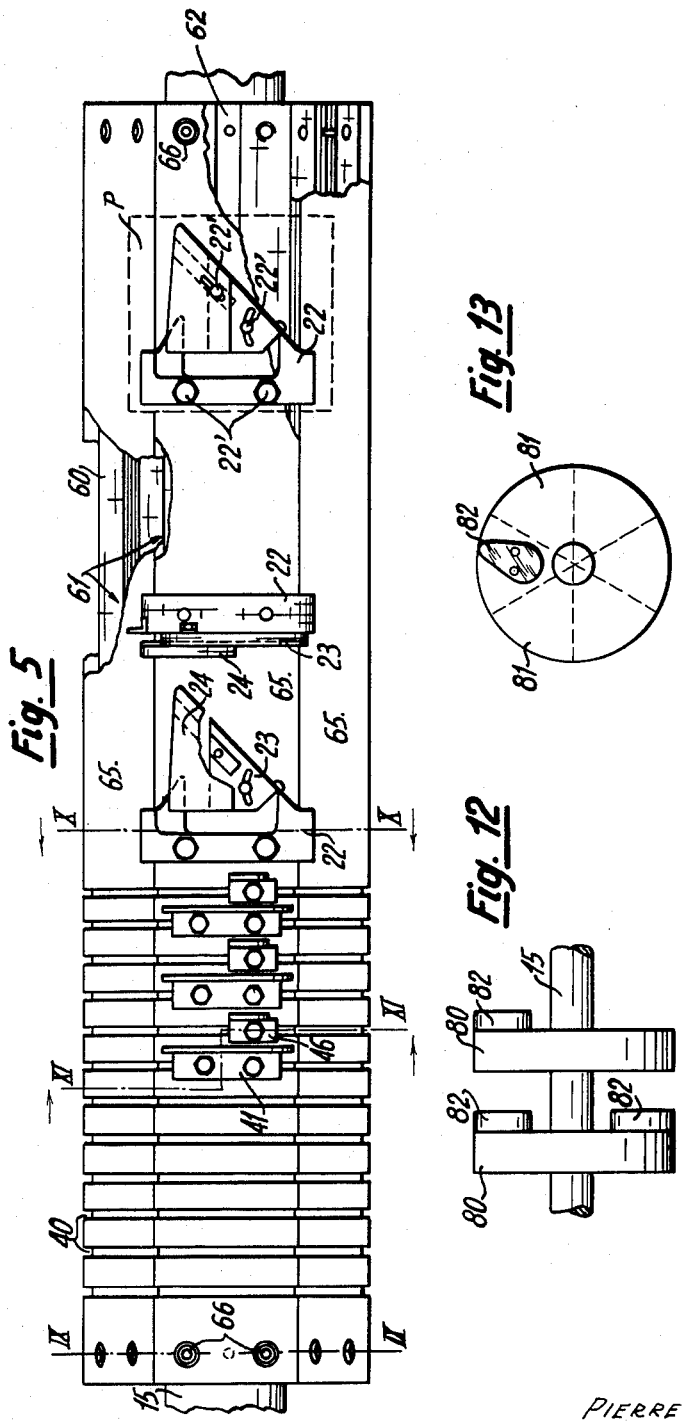

Aug. 31, 1965 P. BERGONZO 3,203,287
CONTROL STATION FOR AN AUTOMATIC LATHE
Filed Sept. 5, 1961 5 Sheets-Sheet 5
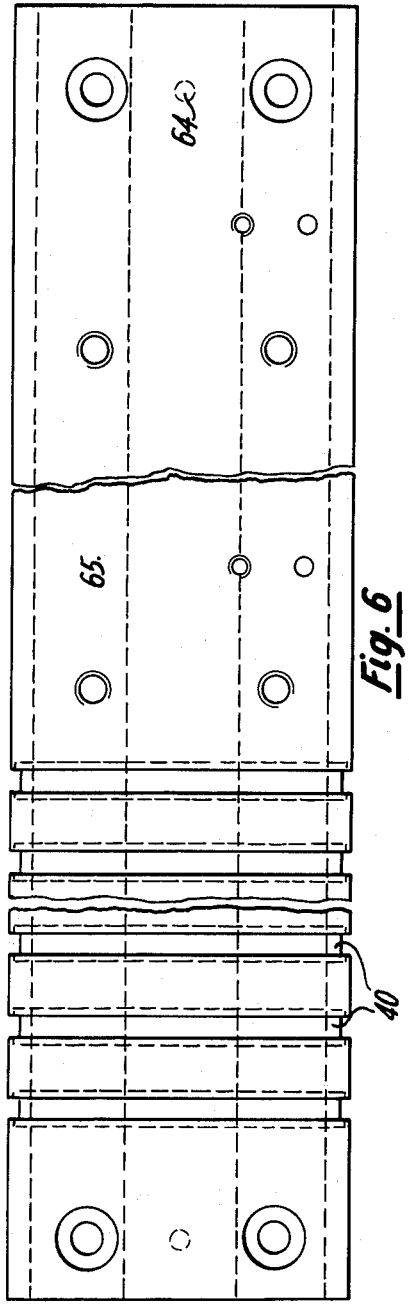
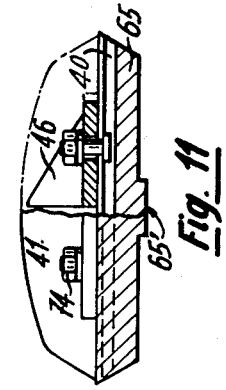
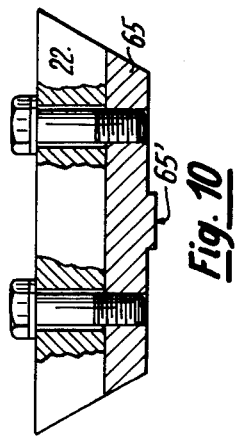
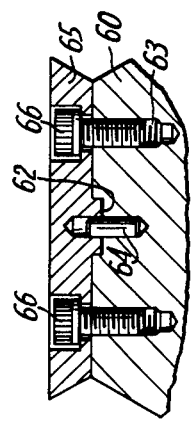
INVENTOR
PIERRE BERGONZO
By Irwin J. Thompson
ATTY.

United States Patent Office 3,203,287
Patented Aug. 31, 1965

3,203,287
CONTROL STATION FOR AN AUTOMATIC
LATHE
Pierre Bergonzo, 117 Route de la Capite,
Cologny, Geneva, Switzerland
Filed Sept. 5, 1961, Ser. No. 135,836
Claims priority, application Switzerland, Oct. 7, 1960,
11,261/60
3 Claims. (Cl. 82—21)

There actually exist automatic lathes provided with bar feeding of little capacity, some of intermediate capacity, but none of high capacity, that is to say capable of machining bars of a diameter greater than 70 mm. This is also true for automatic lathes provided with a mandrel for the machining of rough or of half machined pieces. However, automatic machining operations by a lathe require more and more lathes of greater capacity but the manufacturers have given up manufacturing such lathes since the practice and the experience acquired on the intermediate capacity lathes have proven that the efforts undergone by the cam shafts and the cams controlling the displacements of the tool-carrying slides reach, even for these types of lathes, very high values which render difficult the requirements of security and of precision of the work actually to be performed. It is thus impossible with the aid of the solutions actually at the disposition of the manufacturers to increase still further the capacity of the automatic lathes. Certain of the control cams and more specifically the cam actuating the turrethead carrying slide or the front tool-carrying spindles which present many control sections would be too flexible, too elastic, and too brittle with regard to the considerable efforts that they have to perform.

In order to remedy these drawbacks, certain manufacturers have replaced the flat cams by drum cams, comprising guiding grooves for a feeler which are disposed on the surface of cylindrical drums. These drum cams are of an exaggerated size and can only be used for one well-determined machining operation. Such cams are of a much too high net cost to compensate for the little advantages that they introduce. In the case of machining small repetitive series of workpieces, on has to foresee the stocking of these drum cams which leads to high expenses taking account of the dimensions and the weight of these cams.

Generally the cycle of machining operations of a piece is divided into a number of phases of operations which are equal, and in certain cases, greater than the number of different working positions that the front tool-holder may take.

The setting in an operating position of the lathe is always a lengthy operation and has to be performed by skilled personnel which renders the changing of the cams and the setting of the tool-holder members of the lathe, as well as the setting of the cams to machine a new series of workpieces, very onerous and reduces thus the effective efficiency of the lathe. Moreover, during the changing and setting of the cams and the setting of other control members, the lathe is nonproductive.

Further the cams have to be calculated and manufactured with great attention to ensure the desired precision of the finished piece. It is frequent that several trial sets of cams have to be manufactured before being able to design and to machine the definitive set of necessary cams for the control of an economical machining cycle for the obtention of a given piece. In fact, in the case of complicated pieces, it is generally impossible to determine the set of necessary cams by way of calculations and there does not exist any experimental way enabling one to determine quickly and at low cost the most economical set of cams. This leads to a loss of time which is sometimes out of proportion with the series of pieces to be made.

To remedy these drawbacks, certain manufacturers have equipped their automatic lathes with an electro-mechanical, electronic, pneumatic, etc., control means.

Generally, the control of the machining member of the lathe is effected by means of control members carried by this control means, through the intermediary of electrical contacts, hydraulic relays or power amplifier means.

In fact, the efforts exerted on the cams and the cam shafts become, for lathes of intermediate capacity, prohibitive and constitute a very annoying limitation to the increase of capacity of the lathes. It is in order to limit the efforts exerted on the cam shafts that the manufacturers have had the idea to control power amplifier means with the aid of cam shafts, these amplifier means furnishing from an external source the necessary energy for the actuation of the mobile members of a lathe. Such amplifier means are subjected to relatively infrequent operative defects which are, however, not permissable for the proper operation of an automatic lathe. In fact, the improper operation due to the occurrence of an operative defect of one of these power amplifier means leads generally to the destruction of the lathe or in any case to serious damage thereof. Such operative defects, although seldom, have a decisive influence on the efficiency of a lathe, since if an operative defect occurs, the lathe will have to be repaired, which may require a long time thereby necessitating the immobilization of the lathe.

The electro-mechanical control means comprise generally a drum provided with dogs, the position of which is adjustable and which, through the intermediary of electro-mechanical couplings, control the movement of the slides. The stopping of each of these slides is caused for example by a limit switch, actuated by the slide itself when it reaches its extreme position.

In this type of automatic lathe it always remains dependent of the operation of an electrical contact of the limit switch, and experience has proved that the operating security of electrical contacts is insufficient to ensure an industrial production. On the other hand, the transmission of the movement to the several slides becomes very complex when the number of slides is great and each of them has to be able to be displaced at several different speeds.

The electronic control means lead to very complex installations, the cost of which is out of proportion with the result obtained. The lathes equipped with such control means are of too high a net cost and have from this fact been actually abandoned.

The hydraulic or pneumatic control means may lead to solutions which from the security point of view of the lathe are acceptable. However, the precision obtained by such control means is generally not sufficient for a precision lathe or the necessary hydraulic or pneumatic installations are of a prohibitive cost.

The present invention has for its object a rotative control means for single spindle automatic lathes, comprising lateral and radial tool-holders and a front tool-holder apparatus the slides of which are actuated in their displacements by means of flat cams carried by the control means which cooperate with feelers mechanically connected to the corresponding slides, the control means presenting a number of sectors spaced around the driving shaft, each sector of which bears flat cams located in planes parallel or perpendicular to the driving shaft.

The attached drawings illustrate schematically and by way of example two embodiments of an automatic lathe provided with a control means according to the invention.

FIG. 2 is an end view of the lathe, certain parts being in partial section.

FIG. 3 is a front elevational view of the lathe, certain parts being broken away.

FIG. 4 is a detail at greater scale of the rotative control means.

FIG. 5 shows a second embodiment of the control means of the automatic lathe.

FIG. 6 shows in plan view a removable plate of the control means according to FIG. 5.

FIGS. 7 and 8 are transverse cross sections of the control means along lines VII—VII, VIII—VIII of FIG. 4 respectively.

FIGS. 9 to 11 are cross sections along line IX—IX, X—X and XI—XI of FIG. 5 respectively.

FIGS. 12 and 13 show a third embodiment of the control means.

Figure 1:
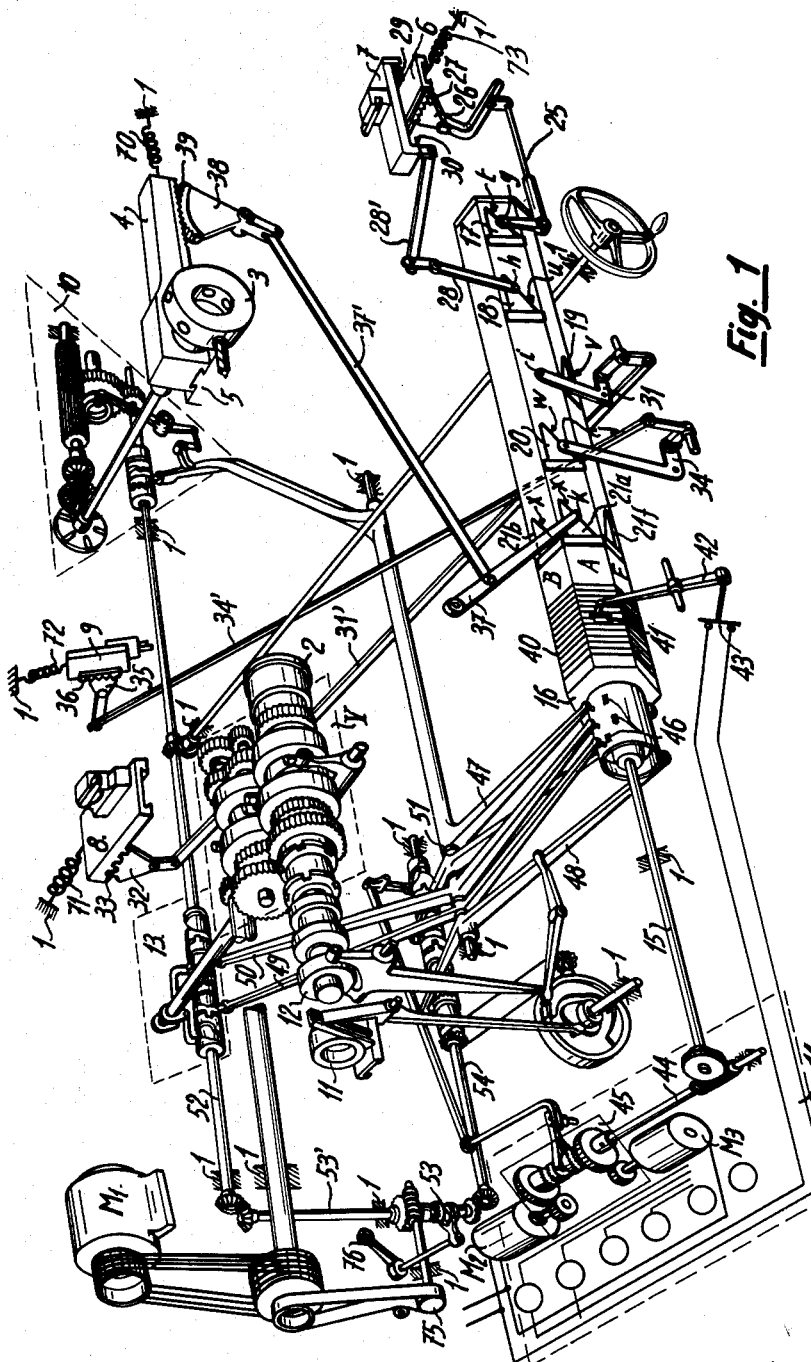
FIG. 1 is a schematic diagram of the several mechanical connections existing between the different members of the lathe.

The automatic lathe illustrated, provided with a control means according to the invention, comprises a frame 1 comprising a headstock in which a workpiece carrying spindle 2 is mounted which is driven in rotation through the intermediary of a gear box V, by an electric motor $M_1$. This automatic lathe is provided with a turrethead 3 carried by a slide 4 which is under the action of a return spring 70 tending to maintain it in a rest position and sliding on slides 5 carried by the frame 1. A cross-slide tool-holder carriage for the turning and threading operations comprises a transverse slide 6 and a longitudinal slide 7 which are movably mounted on frame 1. The radial tool-holder carriages 8, 9 for heading or cutting operations are also movably mounted on frame 1. The slide 6 as well as the two radial carriages 8, 9 sliding on slides carried by the frame 1, are under the action of return springs 71, 72, 73 respectively, tending to maintain them in a rest position, away from the axis of rotation of the workpiece carrying spindle 2 of the lathe.

This automatic lathe is further provided with auxiliary devices comprising an indexing device 10 for the turrethead, a bar feeding device 11, a collet device 12 for the workpiece being machined which is driven in rotation by the spindle 2 of the lathe, and a control mechanism 13 of the gear box V. Further this lathe is provided with a driving device 14 for a shaft 15.

The automatic lathe comprises a rotative control means 16, comprising sectors spaced around its driving shaft the number of which is generally equal or greater than the number of working positions that the front tool-holder may take. In fact, in certain cases, it is necessary to have one or two phases of operations during a complete cycle, during which the front tool-holder stays in a rest position, intended either for cutting operations or for the control of certain auxiliary devices as the bar feeding device for example. The control means are driven in rotation by shaft 15 and carry all of the control members for the displacements of the different tool-holders as well as the actuating members for the auxiliary devices of the lathe necessary for the control of the operations relative to a complete cycle of machining operations of a workpiece, as well as all of the selection members controlling the speed of rotation of the control means. Each of the control members, actuating members and selection members is connected by means of a mechanical connection causing a direct positive control of the member of the lathe that it has to control.

The rotative control means 16 are constitued by a body of general prismatic shape comprising a cylindrical portion and a polygonal portion the number of surfaces of which corresponds to the number of phases of operations which the complete cycle of machining operations is to undergo. The number of phases of operations corresponds generally to at least the number of operating positions that the front tool-holder apparatus may occupy.

The polygonal portion constitutes the first and the third parts of the control means, carrying the control members and the selection members respectively, whereas the cylindrical portion represents the second part of the control means carrying the actuating members. Each of the surfaces of the polygonal portion of the body, corresponding to the first part of the control means, has a number of areas P (FIG. 5) intended to receive control members of each of the tool-holder slides of the lathe. However, the number of control members carried by a surface of the control means is only equal to the number of slides that has to be actuated during the phase of operations considered and controlled by the said surface (at the most six in the illustrated example).

Each face A, B, C, ... F, on the first part of the control means comprises five areas P intended to receive a control member constituted by a flat cam the plane of which is situated in a plane parallel or perpendicular to the rotation axis of the body.

Generally, in a normal cycle of machining operations, only the slide carrying the front tool-holder makes several displacements, generally in equal number according to the number of different operating positions that it may occupy. On the contrary, the other slides are displaced only once during the complete cycle of operations. Under these conditions only the front tool-holder slide will be successively controlled by several control members disposed on different surfaces, generally on each of them, of the control means at corresponding areas P, that is to say on the same portion of the control means.

It is evident that other types of cycles of machining operations may be foreseen, in which several slides are actuated several times, for example twice, during the complete cycle. Particularly, this is the case when making a double cut. The corresponding slide will thus be displaced twice during a complete cycle of machining operations, a first time for pre-cutting and a second time for the final cutting.

In the present case, and by way of example, each of the surfaces A ... F of the control means carries one of the cams $21a ... f$ for the control of the slide 4 carrying the turrethead 3. On the contrary, the slides 6, 7 and the radial carriage 9 are controlled each by a cam 17, 18, 20 respectively, fixed on the surface A of the control station. The radial carriage 8 intended for a cutting operation having to be operated at the end of the cycle of operations is controlled by a cam 19 fixed on the surface F of the control means.

The surface $x$ carried by the cams $21a ... f$ cooperates successively through the intermediary of a feeler $k$ mounted on a lever 37 pivoted on the frame 1. Lever 37 is mechanically connected by lever 37' to a toothed sector 38 engaged with a rack 39 carried by the slide 4 carrying the turrethead 3. Each of these cams $21a ... f$ corresponds in fact to a lobe of a cam of known type intended for the control of a turrethead carrying slide.

The cam 17 actuates a feeler $g$, bearing on the working face $t$ of this cam. The feeler $g$ is carried by a lever 25 pivoted on the frame and mechanically connected to a toothed sector 26 cooperating with a rack 27 carried by the transverse slide 6.

The cam 18 actuates a feeler $h$, maintained in contact with the working face $u$ of this cam. The feeler $h$ is carried by a lever 28 pivoted on the frame and mechanically connected by lever 28' to the longitudinal slide 7. This longitudinal slide 7 slides on the transverse slide 6 and is connected thereto by means of a spring 29 tending to place the longitudinal slide 7 in a rest position with respect to the transverse slide 6. This rest position is reached when the surface 30 of the longitudinal slide 7 enters in contact with the lateral surface of the transverse slide 6 carrying the rack 27.

A feeler $i$ carried by a lever 31 bears on the working surface $v$ of the cam 19. The lever 31 is pivoted on the frame of the lathe and is mechanically connected by lever 31' to a toothed sector 32 in mesh with a rack 33 carried by the radial tool-holder carriage 8.

A working surface $w$ of the cam 20 actuates a feeler $j$ carried by a lever 34 pivoted on the frame of the lathe, lever 34 is mechanically connected by lever 34' to a toothed sector 35 meshing with a rack 36 carried by the radial tool-holder carriage 9.

Each of the mechanical connections connecting a cam to the corresponding slide comprises adjusting means R enabling the adjustment of the amplitude of the displacements or displacement of each slide without it being necessary to modify the position of the corresponding cams or cam with respect to the body of the control means, that is to say to modify the slope or the lift of this cam.

A part of the polygonal portion of the body constituting the third part of the control means 16 is provided with fixing grooves 40 in which the selection members, constituted by dogs 41, are engaged. Known tightening members 74 enable fixing these dogs in any desired position along these grooves 40. The number of fixing grooves 40 is equal to the number of different operating speeds to which the rotative control means may be driven by means of the driving device 14. Arms 42 in equal number to the fixing grooves 40 and disposed in front thereof are pivoted on the frame. One of the extremities of each of these arms 42 is intended to cooperate with the dog 41 fixed in the corresponding groove 40 whereas the other actuates a corresponding electrical contact 43 and determines, by the intermediary of a selection device of the driving device 14, the operating speed of rotation of the rotative control means 16. In this way, it is possible to choose for each phase of operations, controlled by a surface of the control means, a different speed, adapted to the manufacturing operations having to be performed during this phase of operations. On the contrary, the passage from one phase of operations to the following, that is from one surface of the control means to the following, is always effected at this same speed, also determined by the driving device 14. This passage from one phase of operations to the following may be effected very rapidly which contributes to an increase of the efficiency of the automatic lathe.

The driving device 14 of the control means 16 comprises a motor $M_2$ for the driving at high speed of the control means and a variable speed motor $M_3$ for the driving of said control means 16 at the different operating speeds. These motors $M_2$ and $M_3$ are alternatively coupled to a shaft 44 by the intermediary of a coupling 45. The shaft 44 is mechanically connected to the shaft 15 which is itself mechanically connected to the control means 16 for driving same in rotation.

The cylindrical portion of the body constituting the second part of the control means 16 contains actuating members constituted by abutments 46 the angular position of which is adjustable. Each of these abutments 46 cooperates with one of the arms 47, 48, 49, 50, 51 pivoted on the frame 1 of the lathe. Each arm is mechanically connected respectively to the indexing device 10 of the turrethead, to the collet 12 and feed bar 11 devices, to the control device 13 of the gear box, and to the coupling 45 of the driving device 14 of the control means 16. These mechanical connections and different devices are of known type and are currently being used on automatic lathes; they will thus not be described in further detail here.

The actuation of the indexing device 10, of the control device 13, of the collet 12 and the feed bar 11 devices, and of the coupling 45 is affected by means of an actuating shaft 52 mechanically coupled to shaft 53' through the intermediary of a coupling 53. Shaft 53' is connected to a shaft 75 driven by the motor $M_1$. The shaft 53' is also connected to shaft 54 through coupling 53. The coupling 53 is manually actuated by means of an operating member 76.

The operation of the automatic lathe described is similar to a conventional lathe of the same type. However, the control of all the functions relative to a complete cycle of machining operations of a workpiece is centralized on the control means whereas a conventional lathe lacks this control means.

The second embodiment of the control means, illustrated in FIGS. 5 to 11 comprises a body 60 of general polygonal configuration along its whole length. Each of the surfaces 61 comprises a longitudinal guiding groove 62 extending along its whole length, and tappings 63 and a centering pin 64 are disposed at each of its extremities. Each surface 61 is covered with a removable plate 65, the exact position of which with respect to the body 60 is determined by a projection 65' communicating with the guiding groove 62 and the centering pins 64. These plates 65 are fixed on the body by means of socket screws 66 screwed in the tappings 63.

Each removable plate 65 is provided, similar to the control means of the first embodiment, on the one hand with areas P intended to receive the control members or cams and, on the other hand, with grooves 40 intended for the fixing of the selection members 41 as well as the actuating members 46.

This second embodiment presents the advantage of facilitating in an appreciable measure the setting and the adjustment of the cams, as well as the actuating and selection members. In fact, this may be effected most appropriately, for example on a table or work table, away from the machine and even in a room specially utilized for this effect. It is thus possible to set and adjust the cams and members with much more precision than if one proceeds to the setting in place of cams and actuating members on the body, when it is in place on the lathe. This new disposition thus avoids having to take the control means out of the lathe, which is a lengthy and delicate operation, when it is necessary to proceed to a very precise adjustment of the slope and of the lift of each cam and of the position of the actuating members. This results in a saving of time, which provides an increase of the efficiency of the lathe.

It is even possible to provide a number of plates 65 in addition to the ones on the surfaces 61 of the body 60, on which the setting of cams, actuating and selection members are effected corresponding to a new machining cycle, while the lathe is operating according to the machining cycle corresponding to that of the plates on the body. The time to change the removable plates 65 is then insignificant, which leads further to a substantial increase of the efficiency of the lathe.

It is even possible, when one has to make little repetitive series of pieces, to stock a set of plates 65 corresponding to the complete machining cycle of these pieces during the machining of other pieces. In this way, it suffices, in order to begin a new series of these pieces, to fix the said plates 65 on the body 60 of the control means. It is thus possible to obviate the setting and adjusting operations of the lathe before beginning the machining of each new series of pieces and there results therefrom an increase of the lathe efficiency.

It is evident that the number of surfaces 61 may be other than six, this depending on the necessary number of phases of machining operations of a complete machining cycle. The number of cams and actuating members carried by a surface 61 depends on the number of members of the lathe having to be controlled to effect the phase of machining operations corresponding to said surface 61.

In the third embodiment (FIGS. 12 and 13) the rotative control means are constituted by discs 80 rigidly fixed on the shaft 15. If desired discs 80 can be removably mounted on shaft 15. One of the lateral surfaces of each of these discs 80 is divided into sectors 81 to receive control, actuating or selection members 82. The discs 80 correspond in fact to portions of the control means according to the first embodiment wherein control members, actuating members or selection members are mounted on discs to form the first, the second or the third part of the control means. Each sector 81 of these discs corresponds to an area P of a surface of the control means of polygonal shape. It is evident that in a variant each of the lateral surfaces of the discs 80 could be adapted in such a way so as to carry a control, an actuating or a selection member. Further the peripheral surfaces of these discs could be also used for the fixing of the dogs which are adjustable in position to control a member of the automatic lathe.

Three embodiments of the automatic lathe according to the invention have been described and illustrated but it goes without saying that numerous variants could be foreseen without departing from the scope of the protection claimed.

It is evident that the three parts of the control station could be separated from each other while always being driven by the same shaft. The disposition of the different parts of the control means will generally be disposed according to the mechanical couplings connecting each of these parts to the corresponding members. Further it is even possible to foresee that some of the portions of the control means, particularly the one controlling the front tool-holder, can be disposed in such a way that the axis of rotation thereof forms an angle with the axis of rotation of the rest of the control means. In this case there has to exist a mechanical connection between the different portions of the control means thereby ensuring a synchronous driving thereof.

The type or the shape, as well as the mounting of the cams, the actuating and selection members could be different from those described and illustrated. The shape and the mounting of the plates 65 could be differently realized by means of a known device. Each of the plates 65 could be constituted by several independent sections fixed independently onto the body 60.

The body of the control means could be entirely cylindrical or still present another shape, for example that of a nonregular prism. The driving of the control means could be directly effected by the shaft 44 or by the motors $M_2$, $M_3$ so as to eliminate shaft 15 which is frequently the seat of twisting deformations leading to discrepancies in the machining and creating a weak point limiting the capacity of the lathe. On the other hand, the shape of the control or actuating members may be different as far as the desired functions are concerned.

Each of these flat cams may be advantageously constituted by an adjustable cam of the type described in applicant's copending U.S. patent application Serial No. 136,063, filed September 5, 1961, comprising a support 22, a first part 23 angularly displaceable with respect to the support 22, and a second part 24 displaceable with respect with the first part 23 as shown in FIG. 5. Fixing means such as bolts 22' are utilized to fix on the one hand the support 22 on the control means and on the other hand the relative positions of the support 22 and the two parts 23, 24 with respect to each other. These flat cams, the slope and the length of the active profile of which are adjustable independently from each other, may be fixed in a plane parallel or in a plane perpendicular to the shaft 15.

This invention enables obtaining the following advantages with respect to existing automatic lathes:

(1) Increase of the lathe capacity. In fact, each displacement of each slide is controlled by a distinct cam. Under these conditions, it is possible to use cams the profile of each being simple and very strong. It can be seen particularly that each lobe of a control cam of a turrethead slide is replaced by a distinct cam so that all the disadvantages due to the flexibility and brittleness of the lobes of known cams are entirely eliminated.

(2) The capacity of the lathe is thus increased without decreasing the security of operation thereof. In fact, all the controls are mechanical and positive which is not the case for control means using relays or any other intermediate member in the control of the slides and of the auxiliary devices to obtain an increase of capacity.

(3) The possibilities of machining different pieces with the aid of only one and the same set of actuating and control members are increased to a large extent due to the fact that all the control members can be cams the slope and the lift of which can be modified, chosen and fixed at will, and that the actuating and selection members can be adjustable in position on the control means. It follows that the same set of cams can be utilized for the control of different cycles of operations simply by modifying the slope and the lift of these cams as well as the speed of rotation of the control means. It is thus possible to save a large amount of time by obviating the calculation and the machining of many sets of trial cams. This is especially remarkable if one utilises adjustable cams of the type described in the above-mentioned patent application.

(4) The unproductive time of a lathe due to the setting in place of the cams and for their adjustment is reduced to a minimum, especially if one utilises a control means according to the second embodiment comprising removable front plates equipped with the above-mentioned adjustable cams.

(5) It is possible to nearly eliminate the expenses with regard to the calculation and the manufacturing of the cams since the ones being used on the control means have a very simple shape (rectilinear working face) and are adjustable at will so that each cam can be utilized to control several different machining operations.

(6) The passage of one cycle of operations to the next one is very rapidly done, the control means being driven at high speed for the passage of one of its surfaces to the following. This is rendered possible particularly since the feelers of the different slides are not in contact with the cams during this displacement. The dead time between two cycles is reduced to the time necessary for indexing the turret. The calculation of the machining cycle for complicated pieces has shown that it is possible to reduce by 15 to 20% the duration of a complete machining cycle with the control means according to the invention solely by reduction of the dead times between the cycles of operations. It would involve too long a disclosure here to list all the reasons, well known from the men of the art, which enable this reduction of the dead time of a cycle of operations in a lathe equipped with the control means object of the invention.

(7) All the mechanical connections connecting the slides to their control cams have adjusting means which make it possible to adjust the amplitude of the displacement of these slides without modifying the shape or the position of these cams. This leads to an appreciable saving of time during the setting in place for machining a new series of pieces.

(8) The torque necessary for the rotation of the control means is constant due to the fact that during the whole duration of a cycle of machining operations the bearing points of the feelers $g \ldots k$ on the cams 17 to 21 corresponding to said machining operations are always situated at a same distance with respect to the axis of rotation of the control means.

I claim:

1. Control means for controlling the cycle of operation of a machine tool having a plurality of tools successively engageable with a workpiece, the control means comprising a rotatable member, means for rotating the member about an axis, the member having a polygonal outer periphery comprised of a plurality of flat outer surfaces each disposed in a plane parallel to said axis, cam means having elongated cam tracks thereon the length of which is parallel to the associated said surface, support means mounted on each of a plurality of said surfaces, means mounting the cam means on said support means for adjustive sliding movement of said cam means on and relative to said surfaces and each other in any of a plurality of directions in a plane parallel to said surfaces, follower means for controlling said tools according to the shape and location of said cam tracks, and means mounting said follower means for contact with and movement relative to said cam tracks.

2. A machine tool having a plurality of first tools simultaneously engageable with a workpiece and a plurality of second tools successively engageable with said workpiece, and control means for controlling the cycle of operation of the machine tool, the control means comprising a rotatable member, means for rotating the member about an axis, the member having a polygonal outer periphery comprised of a plurality of flat outer surfaces each disposed in a plane parallel to said axis, cam means having elongated cam tracks thereon the length of which is parallel to the associated said surface, support means mounted on each of a plurality of said surfaces, means mounting the cam means on said support means for adjustive sliding movement of said cam means on and relative to said surfaces and each other in any of a plurality of directions in a plane parallel to said surfaces, first follower means for simultaneously controlling said first tools according to the shape and location of said cam tracks, there being a first series of cam means comprising a plurality of said cam means spaced apart along a said outer surface in a direction parallel to said axis, means mounting said first follower means for simultaneous contact with and movement relative to the cam tracks of said first cam means, second follower means for sequentially controlling said second tools according to the shape and location of said cam tracks, there being a second series of cam means comprising a plurality of said cam means spaced apart peripherally about said member, and means mounting said second follower means for contact with and movement relative to the cam tracks of said second series of cam means.

3. A machine tool as claimed in claim 2, said first follower mounting means comprising means mounting said first follower means for movement in a common plane parallel to said axis.

References Cited by the Examiner

UNITED STATES PATENTS

| | | | |
|---|---|---|---|
| 604,306 | 5/98 | Davenport | 29—64 |
| 737,974 | 9/03 | Todd | 29—64 XR |
| 1,083,554 | 1/14 | Miller | 82—21 |
| 2,343,914 | 3/44 | Lloyd | 82—19 XR |
| 2,466,574 | 4/49 | Bullard et al. | 29—64 |

WILLIAM W. DYER, JR., *Primary Examiner.*

RICHARD H. EANES, *Examiner.*